July 14, 1970     F. H. SMITH     3,520,615

OPTICAL PHASE MEASURING APPARATUS

Filed Oct. 25, 1965

INVENTOR
FRANCIS HUGHES SMITH,

ATTORNEYS

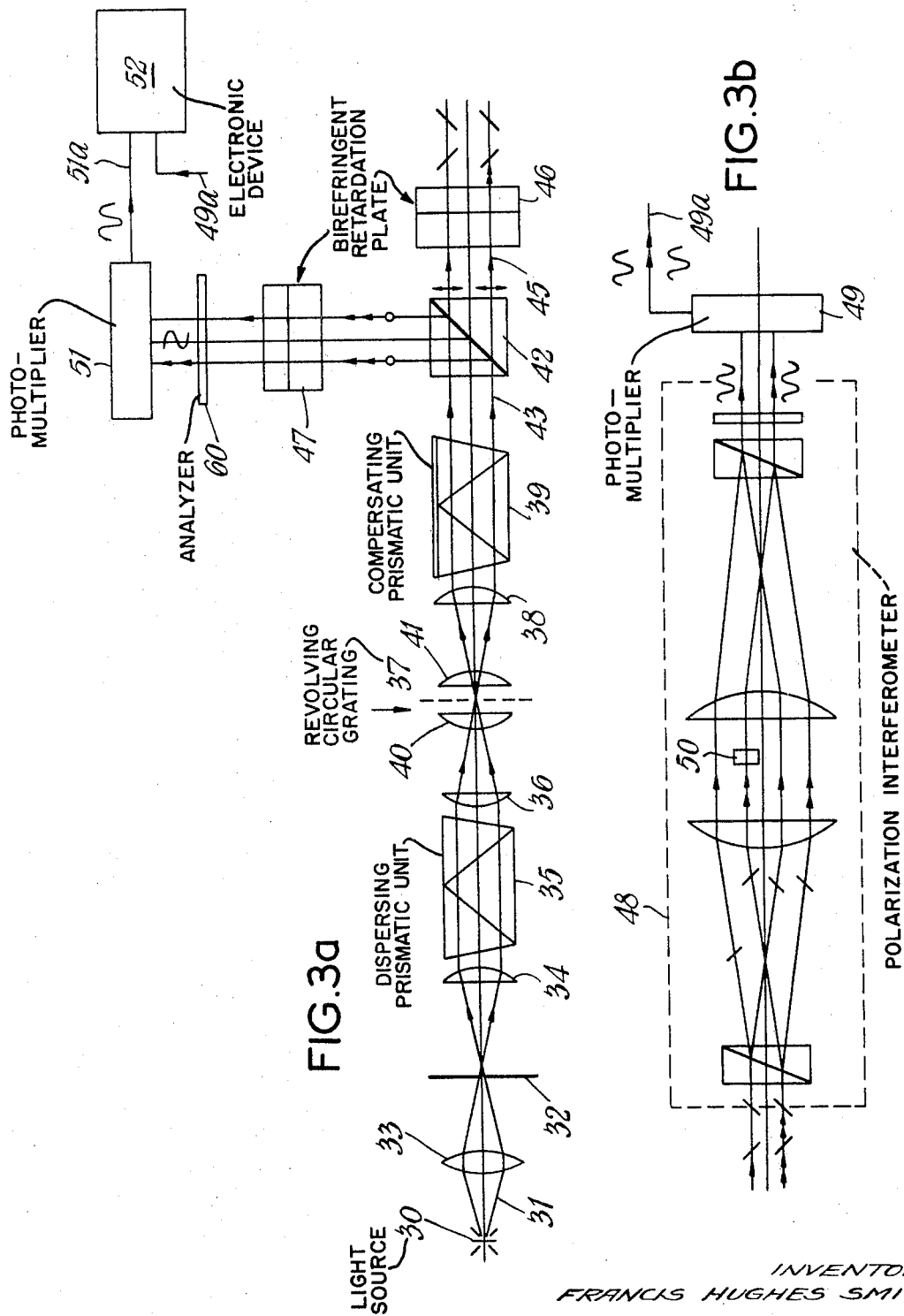

United States Patent Office 3,520,615
Patented July 14, 1970

3,520,615
OPTICAL PHASE MEASURING APPARATUS
Francis Hughes Smith, Surrey, England, assignor to Vickers Limited, London, England, a British company
Filed Oct. 25, 1965, Ser. No. 505,156
Int. Cl. G01b 9/02; G01n 21/40; G02b 21/06
U.S. Cl. 356—106          8 Claims

ABSTRACT OF THE DISCLOSURE

Apparatus for the measurement of the phase difference between two mutually coherent beams of light in which the phase relationship is caused to vary periodically in a manner linearly related to time, means for converting the light intensity resulting from a vectorial summation of the beams into a cyclically varying first voltage and means for measuring the phase difference between this voltage and a second cyclically varying voltage of a frequency which is integrally related to that of the first voltage.

CROSS-REFERENCE TO RELATED APPLICATION

Figure 1:
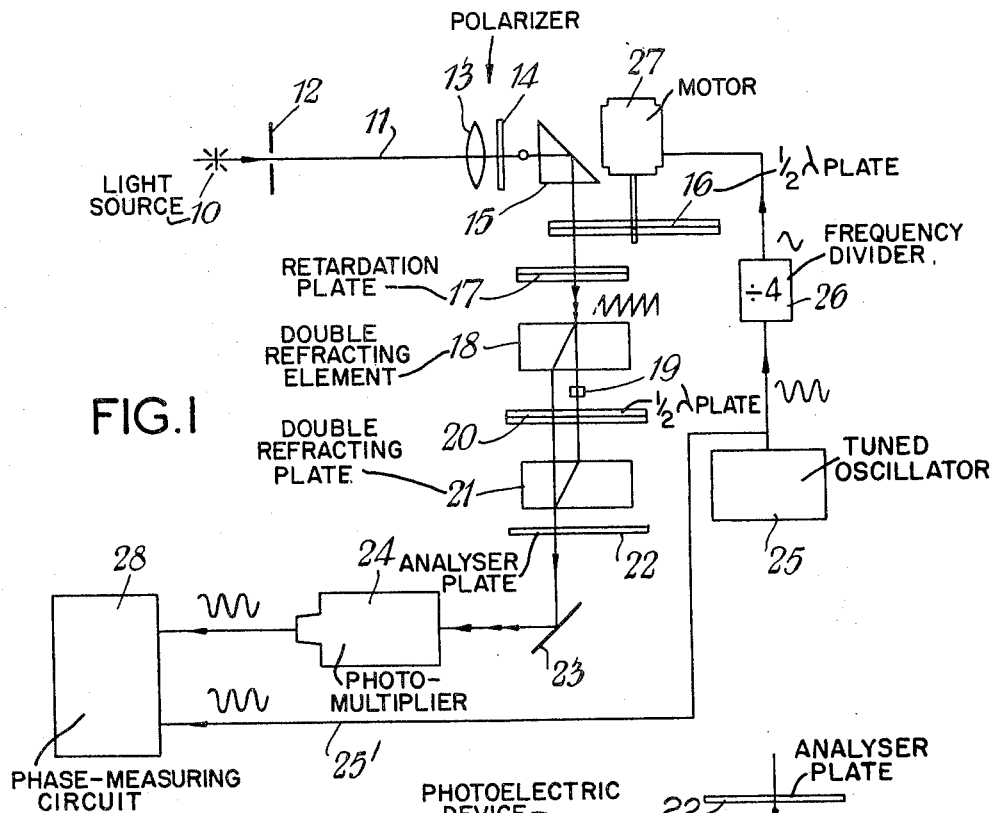

This application corresponds to application No. 34,165/64, filed in Great Britain on Aug. 20, 1964.

SUMMARY OF THE INVENTION

This invention relates to apparatus for measuring the optical phase relationship existing between a plurality of mutually coherent beams of light and is particularly though not exclusively concerned with such apparatus for use in conjunction with interferometers.

It is well known that the light intensity at any point in the field of view presented by a double-beam interferometer is proportional to $$\text{Cos}^2 \frac{\theta}{2}$$

where $\theta/2$ is the angular phase difference between the two beams at this point. It clearly follows that the intensity is a highly non-linear function of the phase difference, a fact which makes it impossible to determine the integral value of the various phase differences over a specified area of the field merely by integrating the corresponding light intensities. At present all that is possible is a very unsatisfactory compromise whereby only special cases having phase differences of less than 45° are considered, so that only the approximately linear portion of the $$\text{Cos}^2 \frac{\theta}{2}$$

function is involved.

It is an object of the present invention to provide apparatus for measuring the optical phase relationship existing between a plurality of mutually coherent beams of light which provides an electrical output having a readily measurable characteristic which is a substantially linear function of phase difference between the mutually coherent beams.

Apparatus, in accordance with the invention, for measuring the optical phase relationship existing between a plurality of mutually coherent beams of light includes in co-operative functional association, means for cyclically changing the phase relationship in a manner which is linearly related to time whereby the light intensity resulting from the vectorial summation of the beam varies cyclically, means for photoelectrically transforming said varying light intensity into a corresponding cyclically varying first voltage, means for providing a second cyclically varying voltage which varies independently of said first voltage but is of a frequency which is integrally related to that of said first voltage, and electronic means for measuring the phase difference between said first and second voltages. The expression "integrally related" used above and in the claims with respect to the frequency of the second cyclically varying voltage is adopted to cover both the case where the frequencies of the two voltages are the same or where one is an integral multiple of the other.

It will be understood that the plurality of mutually coherent beams which are vectorially summed may be provided by any of the well known forms of optical interferometer whereby insertion of an optical phase changing specimen changes the phase relationship existing between the beams and, therefore, correspondingly shifts the phase of the cyclically varying light intensity. Alternatively the plurality of beams may be generated by incidence of a single beam upon a double-refracting specimen, the two orthogonally oriented plane polarized components arising from the birefringence of the specimen then comprising the beams whose phase relationship is to be measured.

It is preferred that the number of coherent beams be two and that their assoicated electric vibration components be linear and mutually perpendicular. This condition is preferred because it permits the instrumentally impressed cyclical change of phase relationship to be imparted by a suitable form of variable birefringent compensator. A suitable and preferred compensator for this purpose is a known modification of the familiar Senarmont compensator which latter, in its conventional form, consists of a fixed quarter-wave birefringent retardation plate followed by a rotatable analyser or of a rotatable polarizer followed by a fixed quarter-wave plate. The known modification which is preferred for the present invention includes the provision of a rotatable half-wave birefringent retardation plate between the quarter-wave plate and the analyser or between the quarter-wave plate and the polarizer, the cyclical change of phase then being achieved by rotation of the half-wave plate. The half-wave plate is preferably arranged to be rotated at constant angular velocity by, for example, a synchronous electric motor connected to an alternating electrical supply. The constant angular velocity of the half-wave plate ensures that the modified Senarmont compensator system imparts a continuous, cyclically changing, phase relationship between the two component coherent beams associated with the vibration directions of the fixed quarter-wave plate, the change being linearly related to time.

If this preferred means for cyclically changing the phase relationship between the coherent beams is to be applied to an interferometer, it is advantageous for the interferometer to be of a double-refracting type in which the two interfering beams are linearly polarized in orthogonal relationship, for example, a Jamin double-refracting interferometer or one as described in British patent specification No. 639,014. The quarter-wave plate of the compensator is then oriented in such a manner that its vibration directions are orthogonal to those of the interfering beams of the interferometer or virtually so.

It will be appreciated that the modified Senarmont compensator will replace either the usual polarizer or analyser of the double-refracting interferometer with which it is associated, depending upon whether it respectively precedes or succeeds the interferometer. Technological advances may make it possible to replace the modified Senarmont compensator with an optically transparent plate whose effective birefringence is cyclically varied by repetitive strain, which strain may either be electrical or mechanical.

An alternative means for changing the phase difference at a constant rate is to employ a form of Pockels cell of the type which is made from some such cubic crystal as cuprous chloride which becomes birefringent in response to application of an electric field directed perpendicularly to the direction of light propagation. By application of two such fields in quadrature relationship from two sinusoidal electric supplies having a phase difference of 90° it is possible to convert the crystal into the equivalent of a birefringent retardation plate revolving about an axis parallel to that of light propagation at the same frequency as that of the electrical supply. By choosing a suitable supply voltage, dependent upon the relevant characteristics of the crystal, the birefringence can be sufficient to make the crystal equivalent to a rotating half-wave retardation plate. Alternatively the pair of electrodes of the Pockels crystal may be driven from a linear time base, such as exist in oscilloscopes, so that the birefringence would repetitively vary linearly with time.

Photoelectric means are provided for transforming the cyclically varying light intensity resulting from the vectorial summation of the beam, into a corresponding cyclically varying first voltage and means are also provided for producing a second cyclically varying voltage which varies independently of the first voltage but is of a frequency which is integrally related to that of the first voltage. The second voltage is preferably derived directly or indirectly from the electrical supply which drives the cyclically changing compensator. For example, if the compensator is of the modified Senarmont type described above, the second voltage is derived from the electrical supply for the synchronous motor. It is, however, also preferable that the first and second voltages be of the same frequency and it will therefore usually be desirable to introduce a frequency dividing, or frequency multiplying, circuit between the supply to the compensator and the output terminals of the second voltage.

An alternative method of obtaining the second voltage is to divide each of the mutually coherent light beams into two component beams, one of which proceeds as before to the photoelectric means which provides the first voltage and the other of which proceeds to a second photoelectric means which provides the second voltage. This method is obligatory if the cyclical change of phase relationship is achieved by scanning fringes of equal chromatic order as follows:

The two beams are caused to have a large optical path difference (several wavelengths) between them so that when re-combined mutually to interfere, they produce the well-known effect of fringes of equal chromatic order. In other words, when the light in the re-combined beams is examined with a spectroscope, the resulting spectrum contains a regular sequence of interference fringes which are located at wavelengths for which the large optical path difference corresponds to phase-differences of integral numbers of periods or half-periods. This spectrum is successively and continuously scanned by a set of uniformly spaced slits which are substantially parallel to the fringes and which move at constant velocity in a direction parallel to the spectrum, that is, at right angles to the fringes. By appropriate choice of the large optical path difference combined with the amount of spectral dispersion, the mean spacing of the fringes of equal chromatic order can be made to match the spacing of the slits. The latter are preferably provided by a circular grating which has alternate clear and opaque elements and is rotated at constant angular velocity. It will be appreciated that the continuous scanning of the slits past the fringes of equal chromatic order results in an outgoing light intensity which varies sinusoidally with the lapse of time. If, now, the large optical path difference is changed, e.g. due to insertion of a phase-differentiated object into one of the beams of the interferometer, then the system of fringes of equal chromatic order will be correspondingly displaced along the spectrum, resulting in a corresponding change in the phase of the sinusoidally changing intensity of the outgoing beam from the interferometer.

Reverting to the measurement of the phase difference between the beams, this is achieved by a two-channel system comprising a reference channel and an interferometer channel. The function of the reference channel is to provide a steady, unmodulated, alternating E.M.F. at the same frequency as that of the interferometer channel, serving to provide a fixed datum to which phase modulations in the object beam are electronically referred in the phase measuring system. One convenient method of obtaining the reference channel, as applied to the scanned fringes of equal chromatic order system, is to employ a polarizing type of interferometer and to use an optically thick birefringent retardation plate or plates to produce the large path difference optically prior to the interferometer. The retardation plate or plates is or are preceded by a polarizing beam splitter, one beam from which subsequently passes through the plate or plates to form the interferometer beam or channel while the second beam from the beam splitter passes trough a birefringent retardation plate or plates of similar properties as the aforementioned plate or plates in the interferometer beam.

The second photo-electric means for obtaining the second voltage may also be applied to an alternative system in which the combined beams are both directed to both photo-electric devices but at different wavelengths. This could be achieved by directing the beams along two paths by means of a dichloric beam-splitter or by insertion of spectral selection filters in the two separated paths. This bichromate system would function as follows. Most phase changing specimens impart a phase change which is substantially an inverse function of wavelength. In consequence of this, a specimen-induced phase change would be greater for the combined coherent beams traversing the path associated with the short wave-length than for the long wave-length path. This difference between the two cyclically varying first and second voltages delivered by the two photo-electric conversion means would therefore be a linear function of the phase changing property of the specimen, which dependent phase difference could be electronically measured as before. Although this form of invention is not preferred on account of its greater complexity, it offers the valuable advantage of a virtually unlimited range of phase measurement. This advantage follows from the fact that the phase difference between the two compound beams can be made very small compared with the over-all phase change due to the specimen by choosing a sufficiently small difference between the two valve-lengths associated respectively with the two compound beams, at the price of a corresponding reduction in sensitivity.

It is preferred that the electronic system for measuring the phase difference between the first and second cyclically varying voltages should provide an output having an electrically measurable property whose magnitude is linearly related to the phase difference. This readily obtainable feature makes it possible to integrate a succession of different optical phase shifts imparted by, for example, a specimen of non-uniform optical thickness being subjected to systematic scanning, the varying output from the phase measuring system then being fed into a suitable form of electronic integrator.

In a preferred form of phase measuring system, an electric wave of rectangular profile is generated whose mark-space ratio is defined by timing electrical pulses derived from points of maximum slope of the first and second voltage wave-forms. Thus, the succession of the rise lines of the rectangular electrical wave-form are initiated by pulses derived from points of maximum slope of one cyclically varying voltage while the fall lines of the same rectangular wave-form are initiated by pulses similarly derived from this other cyclically varying voltage. The time interval between the rise and fall lines of the rectangular wave-form and therefore substantially the same as the time (phase) interval between the two cyclically varying voltages. It follows that the electrical energy in the resulting rectangular wave is proportional to the phase difference between the two voltages.

In a similar system which has the advantage of suitability for display on a cathode ray tube, a set of pulses is derived from one cyclically varying voltage as before but these pulses are caused to "gate" a circuit generating an electrical wave of saw-tooth form, so that the point of linear rise on the saw-tooth wave which is admitted by the gating circuit is linearly dependent upon the phase difference between the initiating pulse and the saw-tooth wave-form. The essential synchronism between the pulse and saw-tooth waves respectively may be ensured by similarly deriving pulses from the second cyclically varying voltage which pulses are used to synchronise a time-base type of circuit producing the saw-tooth wave-form.

It is preferred to combine the apparatus of the invention with a compound microscope to permit the measurement of optical phase changing properties of microscopic specimens. If the microscopical specimens are exclusively birefringent than the relative phase displacements between their "fast" and "slow" vibration components may be measured by combining the apparatus with a suitably modified polarizing microscope. If, on the other hand, it is required to measure the optical shifts of even substantially optically isotropic microscopical specimens, this can be achieved by combining the apparatus with an interference microscope, for example, the microscope described in British patent specification No. 639,014. In particular, it is preferred to employ a double-refracting form of interference microscope realised, for example, by including a microscope objective and condenser immediately before and after the double-refracting interferometer system described above. For the purposes of the invention, the sequence of objective and condenser is immaterial.

Figure 2:
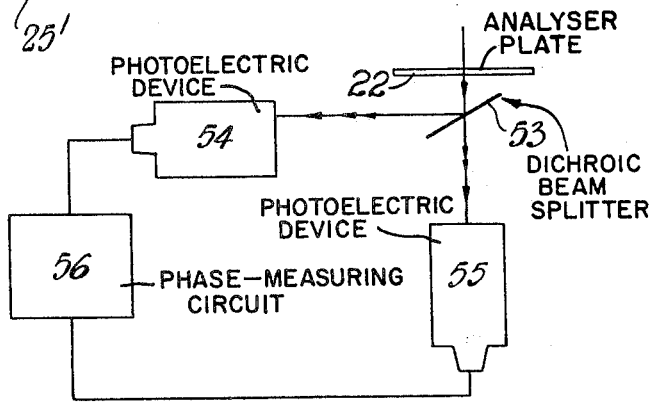

In order that the invention may be more fully understood, two forms of interferometer each including optical phase measuring apparatus in accordance with the invention, will now be described, by way of example, with reference to the accompanying drawings in which FIG. 1 shows a schematic layout of the first interferometer, FIG. 2 shows a modification, and FIGS. 3a and 3b show a similar illustration of the second interferometer.

Referring now to FIG. 1, the arrangement includes a light source 10, a collimator composed of a diaphragm 12 defining a small aperture through which a beam 11 from the source 10 passes and a lens 13. The arrangement also includes a polarizer 14 which plane polarizes the beam, and a prism 15 which reflects the beam through a rotatable half-wave retardation plate 16 and through a fixed quarter-wave retardation plate 17. The half-wave plate 16 is provided with a synchronous driving motor 27 and, by virtue of the rotation of this plate, the beam reaches the fixed retardation plate 17 with its plane of vibration rotating at twice the angular velocity of the plate 16. In accordance with the well-known principles underlying optical propagation phenomena, the rotation of the plane of vibration of the incident beam is converted into a corresponding and linearly related change of phase relationship between the "fast" and "slow" vibration components associated with the quarter-wave plate 17. The two plane polarized components generated by the plate 17 therefore emerge with a cyclical and linearly changing optical phase difference.

The arrangement further includes a double-refracting element 18 for separating the beam emerging from the plate 17 into two paths, into one of which a transparent object 19 may be inserted, the object changing the optical phase relationship between the two component beams. In order to re-combine the two beams, the arrangement includes a further stationary half-wave plate 20 and a second double-refracting plate 21 and in order to convert the cyclically changing phase relationship of the two beams into a corresponding cyclically varying intensity variation, there is provided an analyser plate 22. The combined beam is then reflected by a mirror 23 into a photo-multiplier 24 which transforms the cyclically varying intensity of the beam into a corresponding cyclically varying first voltage whose phase is linearly related to the optical phase-changing property of the object 19.

The electrical supply for the aforementioned synchronous motor is derived from a tuned oscillator 25 via a frequency divider 26. The need for this change of frequency is due to the fact that a single transmission through the rotating half-wave plate results in a sinusoidal output of four cycles whereas a synchronous motor having a single pair of poles completes one revolution for each single supply cycle. The oscillator 25 also provides a reference electronic channel 25'. An equally possible alternative method for ensuring that both electronic channels have the same frequency is to apply the desired frequency direct to the motor and then use a frequency multiplying circuit to raise the frequency of the reference channel, which is derived from the supply to the motor, to that obtained from the photo-electric channel.

The interferometer and reference electronic channels thereafter proceed to an appropriate electronic phase-measuring circuit 28, several of which are known in the art, for example, a rectangular wave system in which the rise of the rectangular wave is derived from a recurrent point of one sinusoidal channel and the fall from a corresponding point of the other sinusoidal channel. The final output would then be a recurrent rectangular wave having a mark-space ratio which is linearly related to the phase difference between the two channels.

In a modification of the apparatus, shown in FIG. 2: The combined beam leaving the analyser 22 is directed to a dichroic beam-splitter 53 which itself directs the beam along two paths. The components of the beam are respectively directed to two photoelectric devices 54 and 55, the photoelectric device 55 producing the reference channel. Both channels are, as for the above described apparatus, fed to an appropriate electronic phase-measuring circuit 56, corresponding to the circuit 28. It will be seen that in this system the second voltage is photoelectrically derived from a portion of the combined beams after their phase relationships have been changed and that the combined beams comprising the portion have a different phase-relationship from the corresponding beams which produce the first voltage. Furthermore, the difference of phase relationship results from the portion being composed of light from a different region of the spectrum from that which comprises the combined beam producing the first voltage, so that the phase difference between the first and second voltage is substantially linearly related to the optical phase difference due to the object.

Referring now to FIGS. 3a and 3b, the arrangement shown here includes an incandescent light source indicated at 30, and in addition to a diaphragm 32, a condenser lens 33 which concentrates the beam of light 31 from the light source on the small central aperture in the diaphragm 32. The arrangement also includes a collimating lens 34 and a dispersing prismatic unit 35 together with a lens 36 which focuses the beam emerging from the prismatic unit to form a continuous spectrum in the plane of a revolving circular grating 37, each transparent element of the grating thus scanning the spectrum at constant velocity. There is also provided a lens 38 for collimating the scanned spectrum and a compensating prismatic unit 39 for removing the initial dispersion of the spectrum. The lenses 40 and 41 are field lenses serving merely to image the first dispersing unit upon the second so as to ensure complete compensation of dispersion. The arrangement further includes a polarizing beam splitter 42 which divides the beam 43 emerging from the compensating prism 39 into two mutually perpendicular plane polarized beams 44 and 45. Thereafter, the plane polarized beam 45 is divided into two mutually perpendicular plane polarized components having a large optical path difference by a birefringent retardation plate 46 and, likewise, the beam 44 by a corresponding retardation plate unit 47; 60 indicates an analyser, which together with the unit 47 constitutes a reference channel.

Subsequently the two components of the beam 45 proceed through any of the well known forms of polarization interferometer for example the interferometer described in British patent specification No. 639,014, except that the necessary initial phase polarization has now already been performed and a further polarizer would have to be omitted. This continuation of the system is diagrammatically shown in FIG. 3b in which 48 denotes the polarisation interferometer, 49 a photo-multiplier and 50 an object, the introduction of which changes the optical path difference between the two beams in the interferometer.

It should be mentioned that the fringes of equal chromatic order produced by recombination of the components of the beam 45 are superimposed upon the spectrum in the plane of the grating 37. In fact, there will be two spectra crossed by fringes of equal chromatic order corresponding respectively to the positions existing before and after introduction of the object 50.

As each transparent slot of the grating 37 passes along the spectrum it transmits a continuously changing mean wave-length of the illuminating beam 31. The thick birefringent retardation plates 46 and 47 introduce relative optical retardations between their associated plane-polarized components which retardations are equivalent to a large number of wave-lengths. The angular phase difference, $\theta$, due to an optical relative retardation, o.p.d. is, $\theta = 360 \times \text{o.p.d.}/\lambda$, where $\lambda$ is the mean illuminating wave-length. It follows that changing the wave-length linearly with respect to time must result in the angular phase difference also being changed linearly with respect to time. The resulting change in intensity is sinusoidal because $I = \cos^2(\theta/2)$. Therefore the light intensity at 49 varies sinusoidally for the above reasons.

Since the light received by the photo-multiplier 49 varies sinusoidally, as indicated, the phase of this sinusoid being changed proportionally to the change of optical phase difference in the interferometer caused by the introduction of the object 50. Similar considerations apply to the photo-multiplier 51 in the reference channel except that there the phase of the intensity sinusoid remains constant. Both photo-multipliers therefore, deliver a sinusoidal E.M.F. of identical frequency but of changing phase relationship due to optical path changes in the object supporting position of the interferometer.

The outputs 49a and 51a are fed into an electronic device 52 for converting these changes of phase relationship into proportionate signals, the device 52 being one of a number of suitable devices well known in the art. The reference channel E.M.F. may be arranged to synchronise a linear time-base such as are common in oscilloscopes, and the corresponding signal from the interferometer channel can be shaped into positive pulses which are arranged to "gate" a phase-independent portion of the rising phase characteristics of the output of the time base. Phase displacement of the interferometer channel correspondingly displaces the phasing of the "gating" pulses so that the height of the combined resultant pulse is proportional to phase displacement.

What is claimed is:

1. In apparatus in which an initially polarized beam of light produced by a plane polarizing means is subsequently resolved into two perpendicularly plane polarized component beams whose optical phase difference is required to be determined, a variable birefringent compensator positioned in the path of the polarized beam of light and provided with means arranged, in operation of the apparatus, to continuously vary the compensating power of said compensator so as to cyclically change the optical phase difference between said component beams in a manner which is linearly related to time, an analyzer for bringing the two beams into parallel plane polarized relationship whereby the intensity of the composite beam leaving the analyzer means is a sinusoidal function of the phase difference between said component beams, a photoelectric detector responsive to the sinusoidally varying light intensity discharged from the analyzer to convert the same into a correspondingly cyclically varying first voltage, means for providing a second voltage which varies synchronously with the cyclically changing optical phase difference introduced by said compensator, and electronic means for measuring the phase difference between said first and second voltages.

2. Apparatus as claimed in claim 1, in which the compensator comprises a fixed quarter-wave retardation means, and a rotatable half-wave retardation plate with which the retardation means is associated.

3. Apparatus as claimed in claim 2, including an electric motor with which the half-wave retardation plate is drivably connected, and means for supplying electrical power to the motor.

4. Apparatus as set forth in claim 3, in which the electric motor is synchronous and in which said second voltage is derived from the electrical power supply to said motor.

5. Apparatus as set forth in claim 1, in which said means for providing a second voltage includes photoelectric means responsive to the cyclically varying light intensity and arranged to derive a voltage from a portion of the combined beams from the analyzer, the combined beams comprising said portion having a different phase relationship from the corresponding beams which produce said first voltage.

6. In apparatus in which an initially polarized beam of light produced by a plane polarizing means is subsequently resolved into two perpendicularly plane polarized component beams whose optical phase difference is required to be determined, birefringent retardation means positioned in the path of the polarized beam and having a large effective birefringent thickness, spectrum forming means disposed in the path of the beam of light for forming a transverse continuous spectrum which exhibits fringes of equal chromatic order due to the large optical path difference introduced by the retardation means, a rotatably mounted radial amplitude grating arranged to scan said fringes so as to cyclically change the optical phase difference between said component beams, an analyzer for bringing the two beams into parallel plane polarized relationship whereby the intensity of the composite beam leaving the analyzer is a sinusoidal function of the phase difference between said component beams, a photoelectric detector responsive to the sinusoidally varying light intensity discharged from the analyzer to convert the same into a correspondingly cyclically varying first voltage, means for providing a second cyclically varying voltage in synchronous relationship with the angular velocity of the rotatable grating, and electronic means for measuring the phase difference between said first and second voltages.

7. Apparatus as set forth in claim 6, in which the grating has alternate clear and opaque elements and is provided with means for rotating the grating at constant angular velocity.

8. Apparatus as set forth in claim 6, in which the spectrum forming means and grating are optically in advance of the retardation means and the apparatus incorporates a beam splitter operative to divide the beam from the grating into two separate beams, one of which provides a reference beam, said means for providing said second voltage comprising a further analyzer arranged in the path of the reference beam for bringing the two component beams of the reference beam into parallel plane polarized relationship, and a photo-detector responsive to the polarized beam for converting the resulting cyclically varying light intensity into said second cyclically varying voltage.

References Cited

UNITED STATES PATENTS 3,041,921 7/1962 Pickels et al. _____ 88—14
3,134,840 5/1964 Gamo _____ 88—14

RONALD L. WIBERT, Primary Examiner

C. CLARK, Assistant Examiner

U.S. Cl. X.R.

356—114; 350—12